United States Patent [19]

McCullough

[11] 4,030,088

[45] June 14, 1977

[54] VEHICLE PROXIMITY SENSING AND CONTROL SYSTEM

[75] Inventor: David Jacob McCullough, Spruce Head Island, Maine

[73] Assignee: Dynascan Corporation, Chicago, Ill.

[22] Filed: Oct. 21, 1974

[21] Appl. No.: 516,656

Related U.S. Application Data

[63] Continuation-in-part of Ser. No. 336,417, Feb. 28, 1973, abandoned.

[52] U.S. Cl. .................... 340/267 C; 212/39 P; 390/258 D; 343/225
[51] Int. Cl.² .................................. G08B 21/00
[58] Field of Search ............ 340/267 C, 258 D; 343/225, 112 CA; 325/29; 212/39 P, 86; 180/98

[56] References Cited

UNITED STATES PATENTS

| | | | |
|---|---|---|---|
| 2,188,293 | 1/1940 | Williams | 343/225 |
| 2,762,913 | 9/1956 | Jepson | 325/29 |
| 3,138,357 | 6/1974 | Whitwell et al. | 340/267 C |
| 3,419,847 | 12/1968 | Bonney | 325/29 |
| 3,537,006 | 10/1970 | Hampton | 325/29 |

Primary Examiner—Glen R. Swann, III

Attorney, Agent, or Firm—Wallenstein, Spangenberg, Hattis & Strampel

[57] ABSTRACT

A position detecting and control system for a vehicle includes a low frequency transmitter and associated antenna and a receiver and associated antenna, one of the antennas being mounted on the vehicle so the distance between the antenna carried by the vehicle and the other antenna is determined by the amplitude of the signal induced in the receiving antenna. The frequency of the transmitter is such that the distances to be monitored are a small fraction of the wavelength of the frequency involved, and any significant signal variations due to signal reflections which can reinforce or cancel the received signal are avoided. The system monitors at least two different spacings between the transmitting and receiving antennas where the signals received at the receiving antenna are of widely different orders of magnitude. Separate range detecting circuits are coupled to a common point of the receiver, each of which includes an attenuator at the input thereof for adjusting the level of the signal to be fed to an associated signal level detector which operates a control device when the signal at the receiver output point involved reaches a level indicating the associated spacing to be monitored.

21 Claims, 6 Drawing Figures

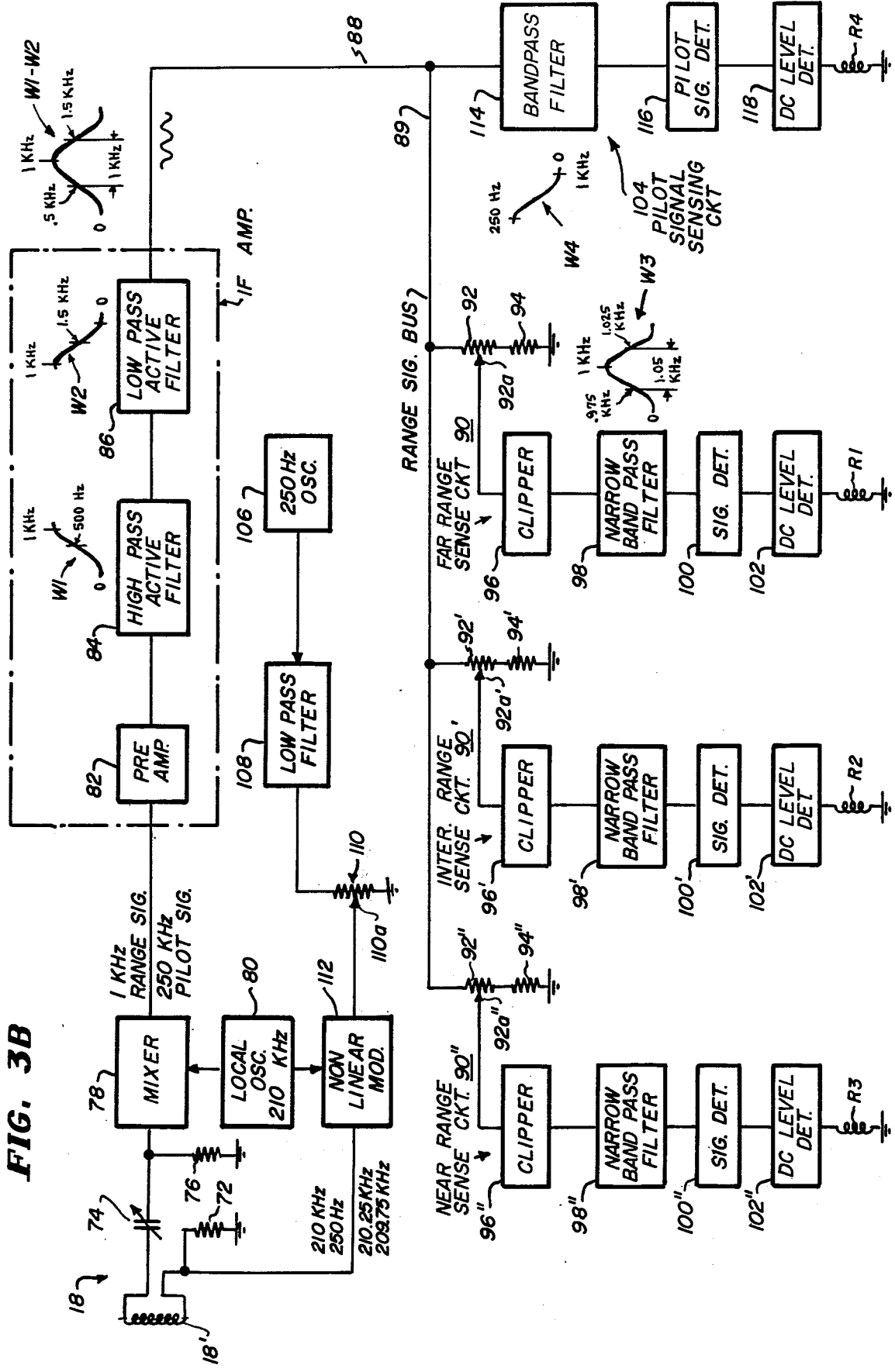

VEHICLE PROXIMITY SENSING AND CONTROL SYSTEM

RELATED APPLICATIONS

This application is a continuation-in-part of application Ser. No. 336,417, filed Feb. 28, 1973, now abandoned.

BACKGROUND OF INVENTION

The present invention relates to a position or proximity sensing system which has its most important application as an anti-collision control system for overhead cranes.

Many different types of position detecting and control systems have been developed for the purpose of preventing one object from striking another. Included among some of the present developments in this field are devices which are intended to prevent aircraft on a collision course from continuing on that course by automatically redirecting them and establishing new conditions of flight to prevent collision of the craft. Land vehicles are also involved in this field of interest, both tracked and untracked. Some of the simpler approaches to proximity sensing anti-collision systems involve the use of cushioned bumpers or other fixed barriers to prevent vehicles from destructively bumping into walls or other objects. Some complicated systems involve the use of radar techniques, including doppler radar, or the use of photo-optics or other electronic or optical sensing means to determine the position and rate of travel of one object with respect to another. Sophisticated control devices have the characteristic drawbacks of being difficult to use and to maintain in use. Also, they are expensive to manufacture and in this sense the use of such devices usually is restricted where economics is a factor in installation and use.

As previously indicated the present invention is particularly adapted for use as an anti-collision system in conjunction with cranes, either electrical overhead or other crane systems. In one crane anti-collision system heretofore developed, each crane carried a transmitter unit including a tone generator and an amplitude level monitoring circuit, the frequency generated by the tone generators being in the low audio range. The system also included a pair or wires strung parallel to and along the crane runway. The outputs of the tone generators in the cranes were connected to the wires strung along the runway and a bridge circuit formed, in part, by the wires produced a signal whose amplitude varied with the position of the cranes. This system is unsatisfactory because the cost of running wires parallel to the path of travel of the cranes and the use of pick-up shoes and associated apparatus would involve a substantial installation and maintenance expense, and raise signal pick-up problems which would make the control system marginal from a reliability and economical standpoint.

The provision of position detecting and control devices for cranes must also take into consideration the operating characteristics of the cranes themselves. That is, cranes frequently are involved in carrying heavy loads pendulously supported below the superstructure of the crane. Accordingly, the crane must be slowly maneuvered to a stop in use or the load may swing violently and may cause derailment of the crane, dropping of the load, or other damage which might be less desirable than if the collision were permitted to occur.

It is also important that the anti-collision system be so designed that it interferes to a minimum degree with the ability of the operator (who for overhead crane installations is generally on the ground and supplied with radio equipment to control the crane remotely) to maneuver the crane, though slowly, adjacent to other cranes or other objects with which it can collide. Thus, while it is important for an anti-collision system to stop a crane approaching another crane or a stationary object at a given speed before it reaches a point where it cannot readily be stopped in time to avoid collision, such systems have heretofore not been designed so that the operator can operate the crane slowly at distances which could cause serious collisions when the crane is moved at a normal speed. However, to make a crane anti-collision system responsive to a particualr speed at which the crane is moving imposes requirements on the anti-collision system which can render it too expensive and complex to make it a readily marketable product.

In addition to the factors just described, manifestly the crane system must be a reliable one which will not be adversely effected by noise and interfering signals. For example, while there have been attempts at designing anti-collision systems for cranes and the like utilizing radio signals between transmitting and receiving antennas mounted on the cranes and stationary portions of the crane trackway, such systems have proved unreliable because of the false operation thereof from interfering signals generated by impulse noise from adjacent electric motors and the like or radio transmitters of ham radio operators or on passing vehicles. Also, some previously proposed radio signal operated anti-collision systems would be rendered inoperable by variations in signal strength caused by signal reinforcement or cancellation due to reflections from adjacent objects. Thus, a radio anti-collision system which measures the spacing between the transmitting and receiving antennas as a function of signal strength at the receiving antenna are particularly subject to false operation by impulse noise interference and signal reinforcement and cancellation due to signal relections from surrounding objects.

Accordingly, it is a general object of the present invention to provide a relatively inexpensive vehicle proximity sensing and control system which performs certain control functions at pre-determined distances between the vehicle and other objects and wherein ambient electrical noise and radio signals will not interfere with proper functioning of the system.

Another object of the present invention is the provision of an improved proximity sensing and control system as above described that is economical to install, easy to maintain, and readily adjustable to different monitoring distances.

A further object of the present invention is to provide a proximity sensing and control system as described which is useful, for example, to prevent collision between a crane and other cranes or stationary objects at the end of a crane trackway without interfering with the ability of the crane operator to move the crane, though slowly, into close proximity to other cranes or the end of a crane trackway. A related object of the invention is to provide a proximity sensing and control system useful for collision prevention or the like, wherein different control operations are to be performed for widely differing monitoring distances. A still further related object of the invention is to provide a radio controlled crane anti-collision system or the like which is not adversely effected by signal attenuation or reinforcement problems caused by re-reflected radio waves.

SUMMARY OF THE INVENTION

In accordance with one of the features of the present invention, to reduce the cost and complexity thereof a low frequency radio linked vehicle proximity sensing and control system is provided wherein the distance between the vehicle and each potential collision point is measured by the amplitude of the received signal. The low frequency operation minimizes problems of false operation because the magnitude of reflected signals from surrounding objects is so small that no significant signal reinforcement or attenuation takes place at the long wavelengths involved. (That is, objects close enough to reflect appreciable signal levels are not generally of a size, one quarter wavelength and greater, to reflect significant radio waves.) The low frequency or frequencies utilized are preferably in the range of from 200 to 400 kHz. An additional advantage of such low frequencies is that FCC regulations permit unlicensed operation of low power radiating devices in this region. Also, use of low frequencies of the order of magnitude of from 200 to 400 kHz also results in minimum interference problems with regard to other radio equipment. Thus, there are very few pieces of radio equipment which operate in this frequency band. Those are all fixed installations like aeronautical and nautical beacons. These beacon systems are low power highly localized sources of radiation and, therefore, would not readily interfere with anti-collision systems located a substantial distance away. Also, radio devices operating in this frequency range are not placed on mobile equipment or other vehicles which might pass in the vicinity of the anti-collision control system involved.

Where such a proximity sensing and control system is utilized to prevent collision of a crane with another crane or stationary object, the system of the present invention is designed to override the operator's speed control setting at a vehicle distance like 50 feet from a collision point by automatically reducing the speed thereof, while permitting the operator to continue to move the crane at a safe slow speed. When the crane moves sufficiently close to another crane or object to raise an impending collision risk, the proximity sensing and control system of the invention operates to stop the slowly moving crane independently of the operator. In a preferred form of the invention, there is provided a third monitoring operation where the crane is at a substantial distance, like 100 feet, from a potential collision point, which operation comprises only signaling an alarm to the operator.

Where the frequency is in the range of from 200 to 400 kHz, the maximum monitoring distance referred to of the order of magnitude of 100 feet spaces the transmitting and receiving antennas a very small fraction of a wavelength, that is within about one tenth of a wavelength, where the induction field component of the electromagnetic wave predominates in strength over the electric field. Such an environment is referred to as a "near field" environment where the signal produced in the receiving antenna is inversely proportional to the cube of the distance of the receiving antenna from the transmitting antenna, and this near field region reception greatly reduces system tolerance requirements for a given range of accuracy. For example, with a system of the type disclosed herein, an amplitude measurement error of 10% will result in a distance measurement error of less than 3%. This is a significant advantage in exercising the type of control functions noted herein.

However, there are numerous known problems associated with the use of low frequencies which may have been responsible for the fact that prior to the present invention no one has successfully applied low frequency radio to crane and other anti-collision systems. One problem is that it is difficult to radiate a strong signal for use in the system, and impulse noise from nearby electric motors and the like produce appreciable noise energy which can readily mask the desired low level signals at the longer monitoring distances of from 50 to 100 feet. In addition, it is important to note that the FCC has imposed restrictions on the radiated signal level for unlicensed devices. This restriction is such that for unlicensed devices operating in the 200 to 400 kHz region the radiated signal at 1000 feet must be below the ambient noise level of an electrically quiet location, so the impulse noise problem cannot be readily solved by increasing materially the power levels of the transmitted signal which is limited by these FCC restrictions. Accordingly, the problems presented have been difficult to overcome.

One known way of minimizing a noise problem is to clip the impulse noise signal at a level above the maximum usable desired signal which the system would receive. In so doing, the average power of the noise signal, whose normal peak values exceed by hundreds of times the actual average amplitude of the continously received desired signal, is materially reduced. However, this kind of clipping would not appear to be useful in a proximity control system where the amplitude of the desired signal received varies so widely, as for example between 1,000 mivrovolts and 1 microvolt at monitoring distances of 10 and 100 feet. Thus, if the signal level is clipped at the maximum 1,000 microvolt level, much of the noise signal gets through, for example at the far distance detection points where the desired signal amplitude is only 1 microvolt.

Another known approach to reduce noise is to reduce the bandwidth of the receiver, which will therefore reduce the energy which the receiver receives of the noise signals. In the prior art, when it was desired to reduce noise effects by bandwidth control, it was conventional to put narrow bandpass filters at a point near the mixer of the receiver (that is, in advance of the I.F. amplifiers) to avoid problems from man-generated signals (which are continuous signals as distinguished from the spiked impulse noise signals). The continuous signals had to be eliminated early in the receiver to avoid saturation effects in the amplifier which would mask the desired signal. When bandpass filters are placed in advance of the I.F. amplifiers, it was unexpectedly discovered that these filters are often shock-excited by impulse noise to produce at the output thereof a continuous signal which resembled low amplitude desired signals. If one could clip the incoming signal, reduced but significant shock-excitation signals would still be produced which have significant amplitudes relative to the low amplitude desired signals. Moreover, it is difficult to clip signals at the microvolt level because the threshold voltages of solid state devices are of the order of magnitude of 0.2 to 0.5 of a volt, and the signals to be clipped are a small fraction of these values. One could clip at a point following a significant degree of amplification, but this causes a problem because desired high level signals would reach magnitudes which were impractical to handle with solid state devices.

The present invention has produced an economical and reliable radio signal detecting system for vehical position sensing purposes which system accomplishes detection of signals over a wide dynamic range, while maintaining optimum frequency and amplitude relationships from the viewpoint of impulse noise suppression. To this end, in accordance with one of the features of the invention, separate range sensing circuits are provided connected in parallel to a common signal output point of the receiver, each circuit having a separate signal level detecting stage responsive to a signal level indicative of a different monitoring distance. Each range sensing circuit further includes an adjusting means which adjusts the level of the received signal at the common receiver signal output point which operates the signal level detecting stage involved. The adjusting means are most advantageously adjustable attenuators, like potentiometers, which adjust the amplitude of the signal fed to the associated signal level detecting stage for a given amplitude signal at the common receiver signal output point. Thus, signals of widely different levels in the receiver are adjustable to comparable levels, so optimum noise reduction techniques can be applied thereto.

In accordance with another feature of the invention, each range sensing circuit including the aforesaid attenuator is provided with a signal clipper or limiter coupled respectively between the output of the associated attenuator and the input of the associated signal level detecting stage, which clipper clips the waveform of a signal fed thereto at a level above that which the signal fed thereto would attain when the transmitting and receiving antennas have the spacing to be monitored by the range sensing circuit involved. Most advantageously, the clipping level is only slightly higher than the desired signal level, but for purposes of circuit tolerances it may clip at an optimum level of not much more than about 3 times the amplitude of the desired signal.

In accordance with a further feature of the invention, for most effective noise suppression, there is coupled to the output of each clipper a narrow bandpass filter which passes only signals of a desired narrow range of frequencies compatible with the stability of the transmitter, and the receiver bandwidth in advance of the common receiver signal output point is relatively wide, as least about 10 times wider than the bandwidth of the narrow bandpass filter. (The bandwidth is measured at the half power or 3 db points on the response curve.)

In accordance with still another aspect of the invention, when the proximity sensing and control system of the invention is applied as a crane anti-collision system, one of the range sensing circuits is adjusted to effect a crane speed reduction operation independently of the position of the operator's controls when the crane reaches a point spaced from a collision point somewhere in the range of about 25 to 50 feet. Another of the range sensing circuits is adjusted to effect a crane stopping operation when the crane reaches a point somewhere in the range of about 10 to 15 feet. It is preferred to provide a third range sensing circuit which is adjusted to effect at least an alerting operation when the crane reaches a point somewhere in the range of between 50 to 100 feet from a collision point.

An anti-collision system would not be very reliable if there were not a means for alerting the operator, and preferably for operating vehicle slow down or vehicle stopping equipment, should there be a failure in the transmitting or receiving portions of the system. Accordingly, as will be explained hereinafter, there are provided highly unique, inexpensive and reliable means for effecting this result under a variety of circumstances like open circuit conditions, short circuit conditions, undue de-tuning of the receiver circuits and the like.

The novel features which are believed to be characteristic of the invention are set forth with particularity in the appended claims. The invention itself, however, together with further objects and advantages thereof will best be understood by reference to the following description taken in connection with the accompanying drawings.

DESCRIPTION OF DRAWINGS

FIG. 3B is a partial circuit and a partial block diagram illustrating a receiver and associated receiving antenna circuit, and included range sensing and pilot signal sensing circuits which can be used for any of the receivers and associated receiving antennas shown in FIGS. 1 and 2;

DESCRIPTION OF EXEMPLARY FORMS OF INVENTION

Figure 1:
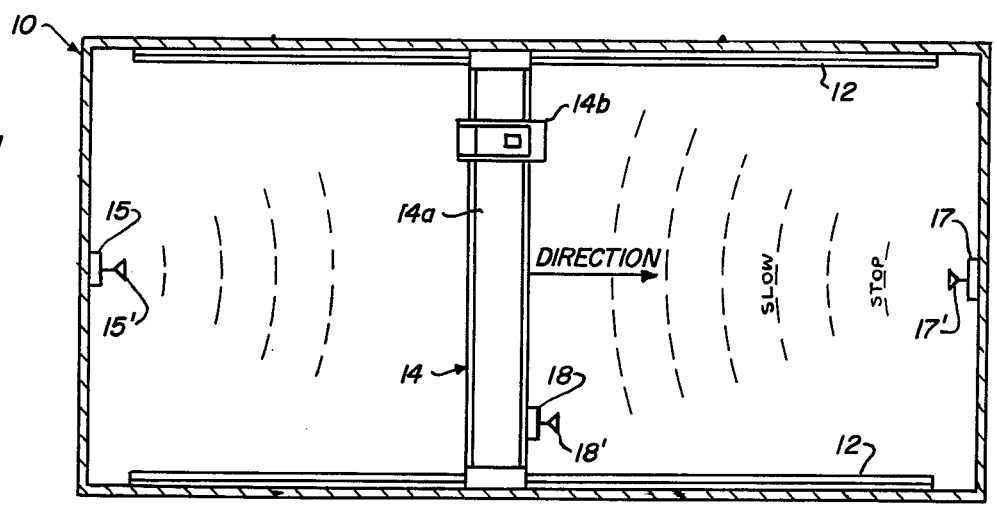
FIG. 1 is a schematic illustration of a crane and crane bay of the type with which the invention disclosed herein may be employed, with various control positions being schematically represented.

Referring more particularly now to the drawings, it should be noted that the position detecting and control system set forth herein may be employed in a single crane bay 10 as illustrated in FIG. 1 of the drawings. As so illustrated, the crane bay 10 is provided with rails or trackways 12—12 along the sides thereof to define a rail path upon which the crane may travel. The crane 14 is provided with suitable power means for movement of the crane along the rails, the crane itself and the power means therefor (not shown) forming no part of the present invention apart from the use thereof with the system set forth herein. The crane comprises a bridge portion 14a which is moved in one direction or another along the rails 12—12, and a load carrying trolley portion 14b which moves on the bridge portion transversely of the rails 12—12 to any desired point therealong.

Located at the opposite ends of the crane bay 10 are a pair of low frequency transmitters 15 and 17 which, in one application of the invention, may operate at the same frequency, or can operate at different frequencies. On the assumption that the transmitters 15 and 17 operate at the same frequency, the crane carries one receiver 18 and associated antenna 18' adapted to receive the frequencies transmitted by the transmitting antennas 15' and 17'. As previously indicated generally the crane 14 would be controlled by an operator located on the ground remote from the crane 14 which may be an overhead crane. In such case, the crane 14 includes an additional receiver (not shown) for receiving radio signals generated by a transmitter carried by the operator on the ground to control the direction of operation of a D.C. motor or the like which controls the movement of the bridge portion 14a of the crane 14 in one direction or another along the rails 12—12 and also the direction of movement of the trolley 14b along the bridge portion 14a. The receiver 18 and its associated range sensing circuits to be described override the operator's control of the movement of the bridge portion 14a along the rails 12—12 in a manner to be described.

While the mode of operation of the crane anti-collision system to be described may take a variety of forms and modes of operation, as illustrated the receiver 18 and related range sensing circuits are designed to effect various control operations when the bridge portion 14a of the crane 14 reaches three different positions relative to either of the transmitting antennas 15' and 17'. One range sensing circuit provides both a moderate slow down and an alarm operation when the crane 14 is, for example, about 100 feet from the transmitting antennas 15' of 17' at one end of the bay 10. (It is assumed that the length of the rails 12—12 is much greater than 200 feet so the crane 14 can be maneuvered for substantial distances without interference from the anti-collision system.) Two pairs of receivers and transmitters operating at different frequencies could be utilized so that the override circuits are differently conditioned for operation depending upon whether the crane is being moved in one direction or the other along the rails 12—12.

When the crane 14 reaches a position where it is spaced more closely to either end of the bay 10, for example, 50 feet therefrom, the receiver 18 and one of the range sensing circuits thereof will, in accordance with the preferred form of the invention, automatically reduce to a greater degree the speed of movement of the crane 14 along the rails 12—12. Finally, when the crane 14 reaches a position closely contiguous to either end of the bay 10, for example, 10 feet therefrom, the receiver 18 and one of the range control circuits will initiate a braking operation which will cause the crane to stop before it can strike the framework at the ends of the bay 10.

As previously indicated, an important feature of the present invention is that the transmitters 15 and 17 operate at a low frequency, most advantageously in the range of from 200 to 400 kHz where, at the monitoring distances referred to of 100 feet, 50 feet and 10 feet, the inductive field component of the radio wave predominates in strength over the electric field, providing an inverse cube relationship between the signal induced into the receiving antenna 18' and the spacing of the receiving antenna 18' from the transmitting antennas 15' and 17'. The advantages of such operation have been previously explained.

Figure 2:
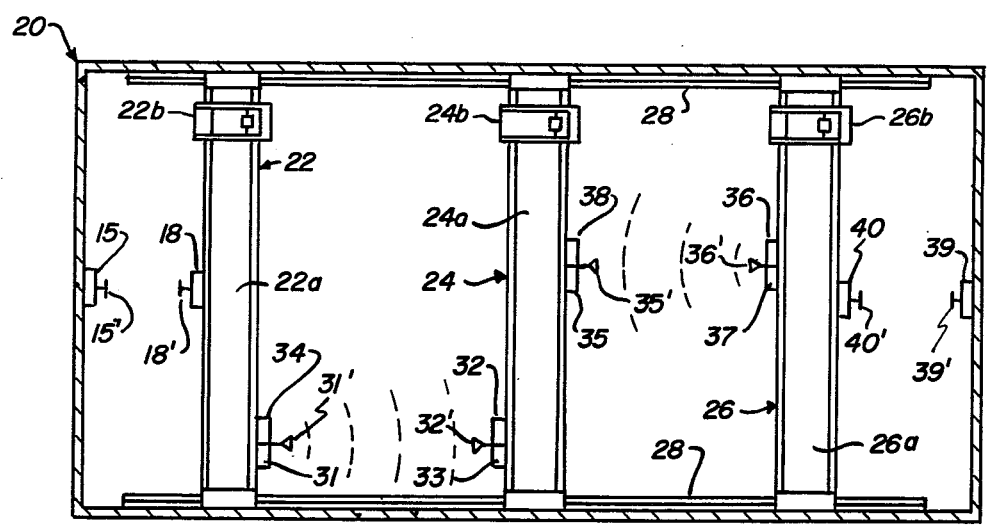
FIG. 2 is a schematic illustration of a multiple crane bay with three cranes in the bay showing how the invention disclosed herein may be employed to maintain a safe, spaced relation between cranes operating in the same area.

FIG. 2 illustrates the use of the present invention in a crane bay 20 which has three longitudinally spaced cranes 22, 24 and 26 movable along common longitudinal rails 28—28. As before, these cranes are preferably controlled by an operator containing suitable remote controlled radio equipment which controls the longitudinal movement of the bridge portion 22a, 24a and 26a of the cranes 22, 24 and 26 and the trolley portions 22b, 24b and 26b movable transversely of the tracks 28—28 upon the bridge portions of the cranes.

For this application, separate transmitting and receiving units operating at different frequencies within the desired frequency range of from 200 to 400 kHz are provided to monitor the different combinations of collision possibilities. Thus, there is provided at the left-hand end of the bay 20 a transmitter 15 and antenna 15' which may be identical to the correspondingly numbered transmitter and transmitting antenna shown in FIG. 1. The adjacent crane 22a is provided with a receiver 18 and receiving antenna 18' which may be identical to the receiver 18 and antenna 18' shown in FIG. 1 on the crane 14a. The transmitter 15 and receiver 18 will, therefore, monitor the relative position between the crane 22 and the left-hand end of the bay 20 in the manner described previously in connection with FIG. 1. That is, when the crane 22 reaches a first position with respect to the transmitting antenna 15', which may be 100 feet, the operator will be alerted of the fact. When the crane 22 approaches a second position closer to the transmitting antenna 15', which may be 50 feet, the maximum possible speed of operation of the crane 22 along the rails 28—28 will be limited to a speed substantially lower than the normal running speed thereof, and when the crane 22 reaches a position close to the transmitting antenna 15', a crane braking operation will take place which will stop the crane before it strikes the structure at the end of the bay 20.

A similar anti-collision system is provided on the cranes 22 and 24 to prevent the collision of the crane 22 with the crane 24 due to movement of the crane 24. To this end, the crane 22 carries a transmitter 31 and associated antenna 31' which generates a low frequency different from that generated by the transmitting antenna 15' in the aforementioned desired frequency range, and the crane 24 carries a receiver 32 and associated receiving antenna 32' which includes range sensing circuits which operate in the same manner as those of the receiver 18 previously described.

Collision of the crane 22 with crane 24 due to movement of the crane 22 is controlled by a transmitter 33 mounted on the crane 24 which generates a signal in the desired low frequency range but different from that transmitted by the transmitters 15 and 31, the transmitter 33 using the aforementioned receiving antenna 32' also as a transmitting antenna. The crane 22 has a receiver 34 including associated range sensing circuits like that previously described.

To prevent collision of the crane 26 with crane 24 due to movement of the crane 26, there is provided a transmitter 35 and associated transmitting antenna 35' on the crane 24 and a receiver 36 and associated receiving antenna 36' on the crane 26. The transmitter 35 and receiver 36 operate in the same manner as the other transmitter and receiver previously described. The transmitter 35, of course, must operate at a different frequency from the frequencies of the other mentioned transmitters. To prevent crane 24 from colliding with crane 26 by movement of the crane 24, crane 26 carries a transmitter 37 operating at a still different frequency from the aforesaid frequencies. The transmitter 37 uses the associated receiving antenna 36' as a transmitting antenna, and the crane 24 carries a receiver 38 which uses the associated transmitting antenna 35' as a receiving antenna, so that the movement of the crane 24 with respect to the crane 26 is controlled in a manner like that described previously.

Crane 26 is prevented from colliding with the right-hand end of the bay 20 by a transmitter 39 and associated transmitting antenna 39' mounted at the right-hand end of the bay 20 and a receiver 40 and associated receiving antenna 40' mounted on the crane 26. Transmitter 39 operates within the desired frequency range but at a different frequency from the other frequencies which are transmitted by the other mentioned transmitters.

When any of the cranes 22, 24 or 26 is moved into very close proximity to another crane or the end of the bay involved, where the crane involved is brought to a stop by the anti-collision system of the present invention, the crane can be moved in the opposite direction.

Figure 3A:
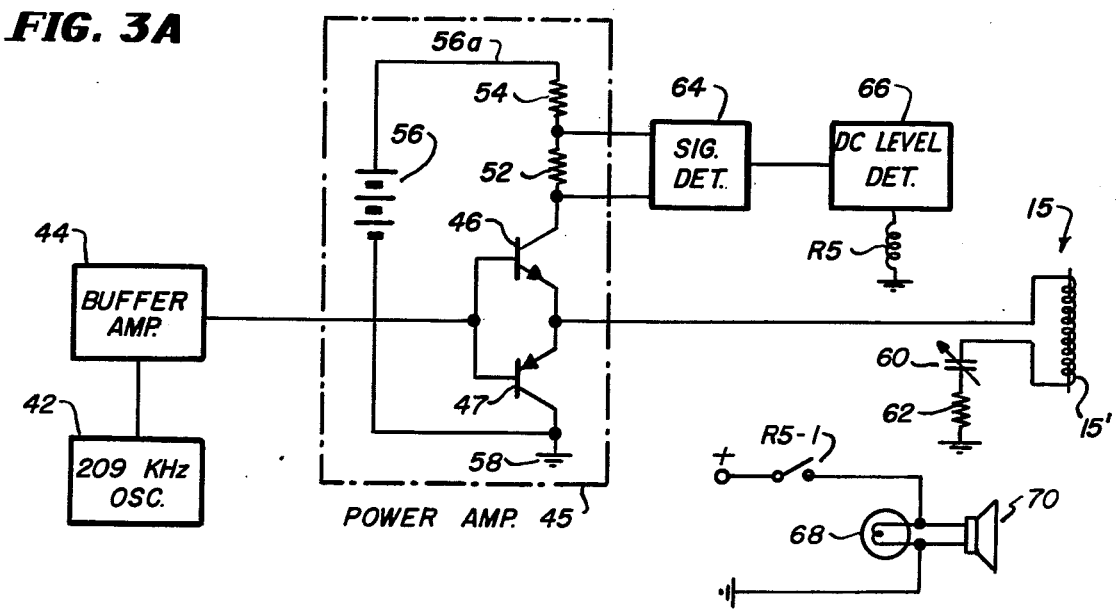
FIG. 3A is a partial circuit and partial block diagram of the transmitter circuit and associated transmitter antenna circuit which can be used for any of the transmitters and transmitting antennas shown in FIGS. 1 and 2.

Refer now to FIG. 3A which illustrates the basic components of a typical transmitter which may be utilized for any of the transmitters described in FIGS. 1 and 2. (Reference numeral 15 has been utilized in FIG. 3A to identify the transmitter involved and the reference numeral 15' has been utilized to identify the transmitting antenna involved only as a convenience to identify the same in the FIG.) The transmitter illustrated in FIG. 3A includes a radio frequency oscillator 42 which is illustrated as operating at the frequency of 209 kHz (although this frequency value will vary between the various transmitters shown in FIGS. 1 and 2). The output of the oscillator 42 is fed to a buffer amplifier 44, the output of which drives a power amplifier 45 which is shown as a transitorized power amplifier operating push-pull. Manifestly, the particular circuit details of the power amplifier form no part of the present invention and can vary widely.

As illustrated, the power amplifier 45 includes a NPN transistor 46 and a PNP transistor 47, the bases of these transistors being coupled to the output of the buffer amplifier 44. The collector of the transistor 46 is coupled through a resistor 52 and a resistor 54 with a power bus 56a connected with the positive terminal of a D.C. voltage source 56. The emitters of the transistors 46 and 47 are connected together, and the collector of the transistor 47 is connected to ground to which the negative terminal of the source 56 of D.C. voltage is also connected.

One terminal of the transmitting antenna 15' is connected to the juncture of the emitters of the transistors 46 and 47, and the opposite terminal thereof is coupled through a tuning capacitor 60 to one terminal of a resistor 62 whose opposite end is grounded. The capacitor 60 is adjusted to form a series resonant tuned circuit with the antenna 15', to provide a minimum impedance condition between the emitters of the transistors 46 and 47 and ground.

Figure 3C:
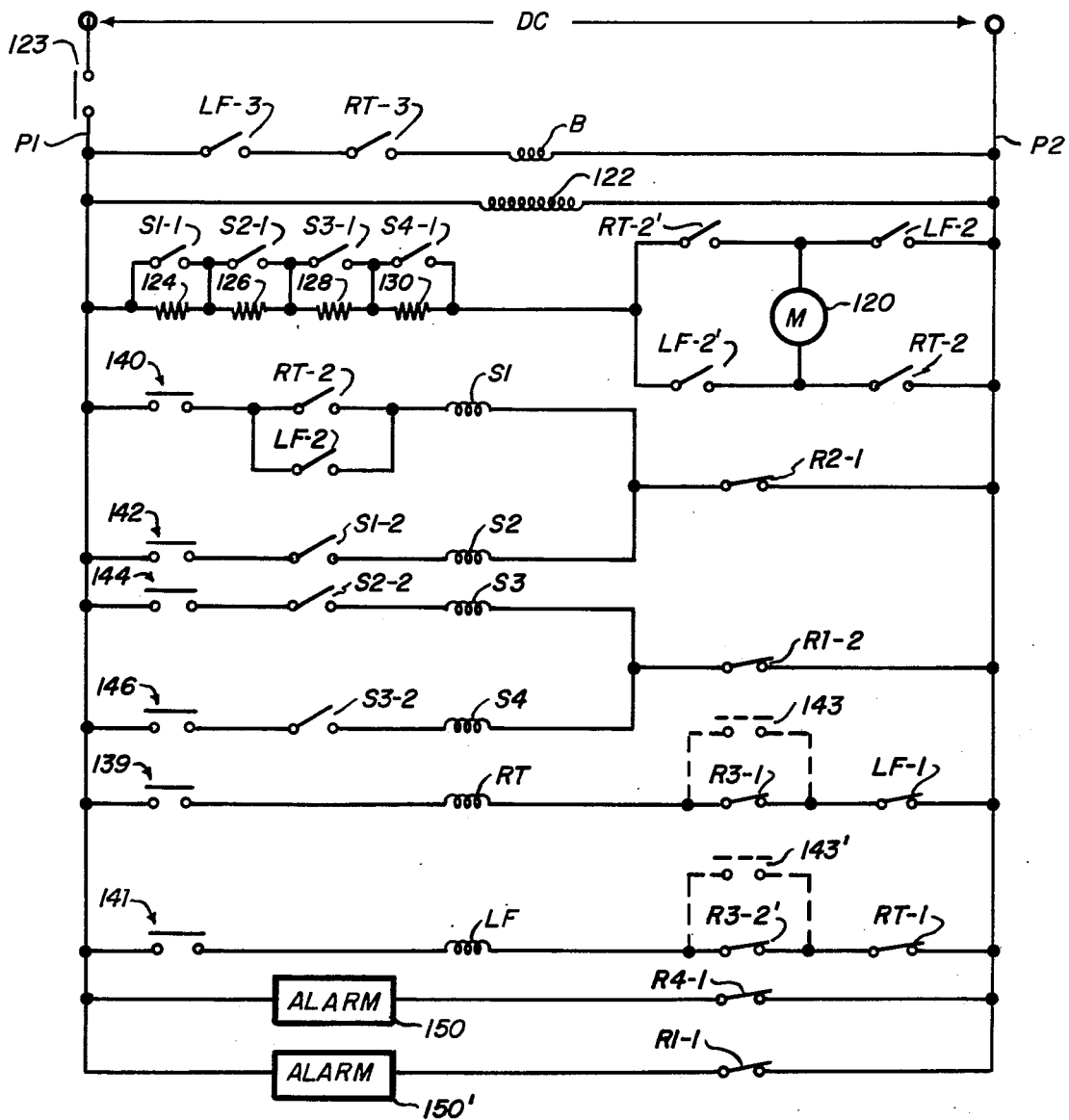
FIG. 3C illustrates a portion of a crane motor control circuit having operator control override contacts therein controlled by the circuits and relays shown in FIG. 3B.

As previously indicated, one of the aspects of the present invention provides a circuit which monitors the proper operation of the transmitter to insure safe operation of the anti-collision systme illustrated in FIG. 3A, 3B and 3C which together form an overall integrated anti-collision system like that shown in FIG. 1. To understand how this monitoring system operates, an explanation of the mode of operation of the power amplifier 45 must be made. Thus, the voltage fed to the bases of the transistors 46 and 47 is a continuous sinusoidal voltage waveform. On the positive half cycles of this waveform, the transistor 46 is rendered conductive to a degree proportional to the amplitude of the voltage involved.

The magnitude of the current flow through the emitter and collector circuit of the transistor 46 depends, in part, on the amplitude of the drive signal on the base of transistor 46 and the impedance of the antenna circuit. Thus, if there is inadequate drive through the transistor 46, the voltage drop across resistor 52 in such case would be relatively low or zero which would also be the case if there were an open circuit which would prevent any current flow through the transistor 46. Also, if the antenna circuit were de-tuned, thereby increasing the impedance of the antenna circuit, this would also reduce current flow and the voltage drop across the resistor 52.

During the negative half cycles of the waveform applied to the bases of the transistors 46 and 47, transistor 46 will be rendered non-conductive and transistor 47 will be rendered conductive by virtue of the energy stored in the antenna circuit which then discharges through the emitter to collector circuit of the transistor 47.

The voltage drop across the resistor 52 is sensed by a signal detector circuit 64 which produces at the output thereof a D.C. voltage proportional to the average voltage drop across the resistor 52. In a unique way to be described, signal detector 64 is designed so that it also produces a relatively low output voltage similar to that produced due to an inadequate drive signal on the base of the transistor 46 or an undesirable de-tuning of the antenna circuit if the emitters of the transistors 46 and 47 should be shorted to ground. While this would produce a very large current flow through the resistor 52 and a supposedly large voltage output in the signal detector 64, the detector 64 will in fact produce a low output.

The output of the signal detector 64 is fed to a D.C. level detector circuit 66 which, when the output of the signal detector 64 drops to a given alarm level, will de-energize a relay R5 whose contacts R5-1 will energize an alarm circuit of any suitable design. As illustrated, the alarm circuit includes an alarm light 68 coupled parallel with a horn 70 which alerts the operator that the transmitter is operating inadequately to assure the proper operation of the anti-collision system of the invention.

Refer now to FIG. 3B which illustrates most of the receiver portion of the anti-collision system. (The balance thereof is shown in FIG. 3C.) FIG. 3B illustrates the receiving antenna 18', one terminal of which is shown connected to one end of the resistor 72 whose other end is grounded. The opposite terminal of the antenna 18' is connected to a tuning capacitor 74, in turn, connected to one end of the resistor 76 whose opposite end is grounded. The signal developed across the resistor 76 is fed to a conventional mixer circuit 78 to which the output of a local oscillator 80 is also fed to produce the usual beat frequency between the local oscillator signal and the received signal. In the example of the invention being illustrated, the local oscillator operates at 210 kHz so that at the output of the mixer there is a 1 kHz intermideiate frequency produced, which is fed to a pre-amplifier 82 whose output is connected to a high pass active filter 84 of conventional design. The high pass active filter 84 may have the response curve W1 shown in FIG. 3B. (As is well known, a high pass active filter is a combination amplifier and filter which produces a desirable bandpass waveform.) The output of the high pass active filter is coupled to a low pass active filter 86 which has a response like that shown in curve W2. The resultant effect of the high and low pass active filters is a composite waveform W1-W2 which has a 1 kHz bandwidth as illustrated. The output of the low pass active filter is coupled to a common receiver output point 88 to which a range signal bus 89 is connected.

Three separate range sensing circuits 90, 90' and 90" are connected in parallel between the range signal bus 89 and a common reference point or ground. The signal appearing at the common receiver output point 88 is also a signal having a value with respect to the same reference point or ground. Since each of the range detecting circuits 90, 90' and 90" are identical, all the details of only one of the range circuits will be described. Corresponding elements in the various range sensing circuits are similarly numbered except a single prime (') and a double prime (") have been added to the reference characters involved. The range sensing circuit 90 is a circuit which, when the crane involved reaches a maximum monitoring distance from a collision point, such as 100 feet, the operator is alerted and preferably the speed of movement of the crane along the rails involved is reduced to a given level. The range sensing circuit 90' operates when the crane involved reaches an intermediate position in advance of a collision point and effects a further reduction in the speed of movement of the crane along the rails involved. The range sensing circuit 90" operates to stop the crane involved when the crane reaches a close proximity to the collision point, such as 10 feet. The range sensing circuits 90, 90' and 90" are operated and respectively preferably effect de-energization of control relays R1, R2 and R3, respectively, or other control devices which control the operation of the motor which drives the crane along the rails, in a manner to be described in connection with the control circuit of FIG. 3C.

Referring to the range sensing circuit 90, there is connected between range signal bus 89 and ground a signal attenuator preferably in the form of a potentiometer 92 and range-limitseries resistor 94. Potentiometer 92 has a wiper 92a which can adjust the voltage thereon to any desired value between a very minimum voltage and a voltage which is the full voltage at the receiver output point 88. Wiper 92a is connected to the input of a conventional clipper 96 which limits or clips any input signal waveform to a value greater than the amplitude of the largest signal through which the range sensing circuit 90 is to respond. As previously indicated, the dynamic range of the desired signal which is picked up by the reciever circuit varies over an extremely wide range which, for the monitoring distances referred to, would vary at least about 60db. For example, the input signal to the receiver may be 1 microvolt when the receiving antenna 18' is spaced 100 feet from the transmitting antenna 15' and 1,000 microvolts when the receiving antenna is spaced 10 feet from the transmitting antenna. When the receiving antenna has the latter far range position, the clipper circuit 96 receives an input signal, for example, of one-tenth of a volt. The clipper 96 may be adjusted to clip an input signal waveform having an amplitude greater than one-tenth volts, such as about three-tenths volts.

The wiper $92a'$ of the potentiometer 92' at the input to the intermediate range sensing circuit 90 is adjusted so that when the voltage at the receiver output terminal 88 is of a magnitude corresponding to the distance monitored by that range sensing circuit, such as the 50 foot exemplary monitoring distance, the input to the clipper 96' thereof would be of the same order of magnitude as the input to the clipper 96 when the crane involved is at the 100 foot monitoring distance referred to. Similarly, the input potentiometer 90" of the near range sensing circuit 90" is adjusted to provide a signal at the input to the clipper 96" of the comparable magnitude to that present at the inputs to other clippers 96' and 96 when the receiving antenna is in the exemplary near range monitoring position of 10 feet. Thus, even though the received signals have a wide dynamic range, by virtue of the use of the attenuating potentiometers referred to, the various range sensing circuits can be identically designed for optimum operation.

The output of the clipper 96 is fed to a narrow bndpass filter 98 which may have a response curve like that illustrated by the exemplary curve W3, which has a bandwidth of 0.05 kHz. Such a narrow bandwidth materially reduces the effect of impulse noise and other possible interfering signals. The narrow bandpass filter 98 preferably has as narrow a bandpass as possible consistent with the expected variation in the frequency of the transmitter oscillator 42, which may be of the order of magnitude of from 0.01% to 0.05% variation. The overall bandwidth of the intermediate frequency amplifier stages formed by the pre-amplifier 82 and the high and low pass active filters 84 and 86 is made intentionally much wider then the bandwidth of the narrow bandpass filter 98, at least 10 times wider, because this makes the action of the clipper 92 in noise reduction most effective.

The output of the narrow bandpass filter 98 is fed to a signal detector 100, which may be a conventional signal detector which rectifies then filters out all but D.C. components of the rectified signal, to present at its output a D.C. voltage which is fed to the input of a D.C. level detector 102. The D.C. level detector 102 may be a Schmidt trigger circuit or other circuit which, when the input D.C. signal rises to a given reference level, effects a switching operation which de-energizes the associated relay R1. It is preferable that the relay R1 be a relay which is normally energized, so that any failure of the relay will have the same result as the approach of the crane involved to within the first monitoring range to be detected by the associated range sensing circuit 90.

It is, thus, apparent that as the crane approaches the various monitoring distances referred to, such as 100 feet, 50 feet and 10 feet, the relays R1, R2 and R3 will become de-energized to effect the control operations previously described.

It is, of course, important to alert the operator of the crane if the receiver circuit is not operating properly. For example, if the receiver antenna 18' should be short circuited or the antenna circuit becomes open circuited or the receiver becomes defectively de-tuned so that it cannot effectively amplify and produce the needed signals to operate the range sensing circuits referred to, it is desirable to provide some means for alerting the operator that the anti-collision system may not be operating in the way it was intended to operate. To this end, another feature of the present invention deals with a unique way of generating a pilot signal of a different frequency than the desired intermediate frequency of 1 kHz in the exemplary form of the invention being described. A pilot signal detecting circuit 104 is connected to the common receiver output point 88 to determine whether this pilot signal is of sufficient value to indicate that the receiver circuit ahead of the same is operating properly.

A pilot signal oscillator 106 is provided, which may be an inexpensive resistor-capacitor audio oscillator operating, for example, with a frequency of 250 hertz. It is assumed that the bandpass of the intermediate frequency amplifier portion of the receiver is such that a 250 hertz signal, though attenuated by the response curves thereof, will pass through the receiver and reach a magnitude at the receiver output point 88 to be detected by the pilot signal sensing circuit 104 when the receiver is operating properly. The output of the oscillator 106 is fed to a low pass filter 108 which will filter out as signals substantially greater than 250 hertz. The output of the low pass filter 108 is advantageously fed to a potentiometer 110 to provide an adjustment of the magnitude of the pilot signal at the receiver output point 88, so that the pilot signal sensing circuit will operate at a given minimum pilot signal level.

The wiper 110a of the potentiometer 110 is coupled to the input of a second mixer 112 to which the output of the local oscillator 80 is also fed. There is thereby produced at the output of the second mixer 112 sum and difference frequencies of the frequencies fed to the mixer 112, namely frequencies including 210.25 kHz and 209.75 kHz. The output of the mixer 112 is coupled across the resistor 72 in the antenna input circuit so that the pilot signal will be fed to the mixer 78 if there are no open circuits in the antenna input circuit. The beating of the local oscillator 210 kHz frequency with the beat frequencies of 210.25 kHz and 209.75 kHz generated by the second mixer 112 will produce a beat frequency at the output of the mixer 78 of 250 hertz. The advantage of this unique pilot signal generating technique is that all the receivers in the anti-collision system used in a multi-frequency anti-collision system as is required in the FIG. 2 embodiment of the invention can be identical except for the local oscillators thereof and the tuned input circuits, since the double use of the local oscillator 80 in connection with mixers 78 and 112 will automatically produce the desired intermediate pilot signal frequency of 250 cycles independently of the actual frequency of the local oscillator involved in the receivers. This maximizes the standardization of the receiver design, which materially reduces manufacturing costs.

The pilot signal sensing circuit 104 most advantageously includes a pilot signal bandpass filter 114 connected to the common receiver point 88 and which may have a response curve like that shown by curve W4 which filters out the 1 kHz intermediate frequency from the output thereof. The output of the bandpass filter 114 is coupled to a pilot signal detector 116 which may be a conventional detector which rectifies and then filters varying components to produce a D.C. voltage in the output thereof which is proportional to the amplitude of the signal fed to the input of the detector 116. The output of the detector 116 is fed to a D.C. level detector circuit 118, which may be a Schmidt circuit. Such a circuit will effect a switching operation when the input voltage thereof drops below a given monitoring level (or raises above a given monitoring level). Accordingly, when the pilot signal amplitude at the receiver output point 88 drops below a given adjusted level, the D.C. level detector 118 will effect a switching operation to de-energize the relay R4 and alarm the operator and also, if desired, limit the speed of the crane involved.

Refer now to FIG. 3C which illustrates the control circuit for the motor which controls movement of any of the cranes in FIGS. 1 or 2 along the associated rails. While the motor may be an A.C. or D.C. motor, it will be assumed for purposes of exemplary description that the motor is a D.C. motor having an armature 120 and shunt windings 122. The shunt windings 122 are shown connected between power lines P1 and P2, power line P1 being connected to one terminal of a source of D.C. voltage through a suitable set of power control contacts 123. The armature 120 is connected to a series circuit of speed-reducing resistors 124, 126, 128 and 130 connected between the power line P1 and a set of normally-open contacts RT-2' connected to one terminal of the armature 120. A set of normally-open contacts LF-2' are connected between the left end of contacts RT-2' and the other terminal of the armature 120. A set of normally-open contacts LF-2 extend between the former armature terminal and the power line P2 and a set of normally-open contacts RT-2 extend between the latter armature terminal and the power line P2. (Reference to normally-closed contacts and normally-open contacts respectively mean that the contacts involved are closed and open when the relay controlling the same is de-energized.) The contacts RT-2 and RT-2' are controlled by a direction relay RT which is energized when the associated crane is to be operated to the right as viewed in the drawings. The contacts LF-2 and LF-2' are controlled by a direction relay LF which is energized when the crane involved is to be moved to the left as viewed in the drawings. The armature 120 and the associated contacts just described form a bridge circuit whereby when the direction relay RT is energized the contacts RT-2 and RT-2' are closed to operate the armature 120 in one direction and when the direction relay LF-2 is energized the contacts LF-2 and LF-2' are closed to operate the armature in the opposite direction. The speed-reducing resistors 124, 126, 128 and 130 are respectively shunted by normally-open contacts S1-1, S2-1, S3-1 and S4-1 of speed control relays S1, S2, S3 and S4 which, when energized, close the associated normally-open contacts. Thus, when all of the speed-reducing resistors 124, 126, 128 and 130 are connected in series with the armature 120, the motor will operate at its slowest speed, provided the armature and field windings are energized. As the speed control relays S1, S2, S3 and S4 are energized in succession, the associated contacts S1-1, S2-1, S3-1 and S4-1 will close to shunt the associated resistors and progressively increase the speed of the motor 120 accordingly.

When both direction control relays RT and LF are de-energized, the armature 120 is disconnected from the power lines P1 and P2 to de-energize the motor. If desired, a brake may be provided operated by a brake solenoid B having one terminal connected to the power line P2 and the other connected to the power line P1 through a series connected normally-closed contacts RT-3 and LF-3 of the direction relays RT and LF. Thus, if both the relays RT and LF are de-energized, the brake solenoid B will be energized to effect a braking operation on the motor. However, if either of the relays RT and LF are energized, then the brake solenoid B will be de-energized, to release the brake.

the direction relay RT has one terminal connected through a set of manually and radio controlled contacts 139 to the power line P1 and its other terminal connected through series connected contacts R3-1 and LF-1 to the other power line P2. The contacts R3-1 are normally-closed contacts of the relay R3 of the near range sensing circuit 90 of the associated receiver. Contacts LF-1 are normally-closed contacts controlled by the direction relay LF of the crane involved. Thus, the crane involved cannot move to the right except when the manually operable contacts 139 are closed, the crane involved is beyond 10 feet from a collision point and the direction relay LF is not energized.

The direction relay LF has one terminal connected through manually and radio controlled contacts 141 to the power line P1 and another terminal connected through series connected normally-closed contacts R3-2' and RT-1 to the other power line P2. The contacts R3-2' may be contacts controlled by the relay R3 of the near range sensing circuit 90'' of the associated receiver, which may be the case for the form of the invention previously described and shown in FIG. 1, where there is only one receiver and two transmitters oprating at the same frequency, or by the control relay R3 of a near range sensing circuit of a different receiver operating at a different frequency and which selectively controls the crane to prevent collision thereof with other cranes or objects on the left of the crane. The latter operation of the circuit is necessary for the anti-collision system shown in FIG. 2 (and can be used for a single crane system like that shown in FIG. 1 if modified to form a multi-frequency system). The contacts RT-1 are controlled by the direction relay RT. Accordingly, a given crane cannot be moved to the left unless the associated manually and radio controlled contacts 141 are closed, the associated direction relay RT is de-energized and the crane is free to move to the left without any collision risks. In the case where the contacts R3-2' are controlled by the same relay as the contacts R3-1 as in the FIG. 1 embodiment of the invention, then, to enable the crane involved to reverse direction, manually and radio controlled override switches 143 and 143' may be provided to shunt contacts R3-1 and R3-2' (see dashed lines), or some other means must be provided to automatically reopen the contacts R3-1 and R3-2' after a given time delay.

The speed control relay S1 is energized through a circuit including manually and radio controlled contacts 140 connected between the power line P1 and parallel connected, normally-open contacts RT-2 and LF-2 of the direction relays RT and LF, in turn, connected to one terminal of the speed control relay S1. The other terminal of the latter relay is connected through a set of normally-closed contacts R2-1 of the relay R2 of the intermediate range sensing circuit 90' of the associated receiver. Accordingly, when the associated crane is located beyond 50 feet from a collision point, the contacts R2-1 will be closed to prepare the speed control relay S1 for energization when the manually controlled contacts 140 are closed. The relay S1 cannot be energized unless contacts RT-2 or LF-2 are closed, requiring the direction relay RT or LF to be energized. Energization of relay S1 closes contacts S1-1 to shunt resistor 124 and operate the motor at a higher speed.

The speed control relay S2 has one terminal connected through normally-open contacts S1-2 of relay S1 and manually and radio controlled contacts 142 to the power line P1. The other terminal of speed control relay S2 is connected to the terminal of contacts R2-1 remote from the power line P2. Acordingly, if after energization of S1 a higher speed is desired, operation of manually controlled contacts 142 will energize relay S2 when the crane involved is located more than 50 feet beyone a collision point. Energization of the speed control relay S2 will close contacts S2-1 to remove resistor 126 from the armature circuit and thereby increase the speed of the motor a given amount.

When speed control relays S1 and S2 are both energized, a set of normally-open contacts S2-2 of relay S2 are closed to connect one terminal of the speed control relay S3 through the radio controlled contacts 144 connected to the power line P1. The other terminal of the speed control relay S3 is connected to the power line P2 through a set of normally-closed contacts R1-2 of the relay R1 of the far range sensing circuit 90 of the associated receiver. Thus, when the associated crane is beyond 100 feet from a collision point, the relay S3 will be energized if relays S1 and S2 are energized and manually controlled contacts 144 are closed. When relay S3 is energized, contacts S3-1 will close to shunt resistor 128 to operate the motor at its next highest speed.

The relay S3 has a set of normally-open contacts S3-2 positioned between one terminal of the speed control relay S4 and manually and radio controlled contacts 146 connected to the power line P1. The other terminal of the relay S4 is connected to the terminal of the contacts R1-2 remote from the power line P2. Thus, when the associated crane is positioned beyond 100 feet from a collision point and relays S1, S2 and S3 are energized, closure of manually controlled contacts 146 will energize the relay S4 to close contacts S4-1 to operate the crane motor at its highest speed.

It should now be apparent that when a crane moves within the maximum range point being monitored, 100 feet in the exemplary form of the invention being described, relay R1 will become de-energized to prevent energization of or to de-energize speed control relays S3 and S4, insuring the presence of resistors 128 and 130 in series with the motor armature. This, in turn, assures that the crane motor be operated only at intermediate and low speed levels.

When the crane involved moves to a point within the intermediate monitoring range, that is within 50 feet of a collision point, relay R2 will become de-energized to open contacts R2-1. This will prevent energization of or de-energize relays S1 and S2, and will prevent the energization of or de-energize relays S3 and S4, to effect opening of the resistor shunting contacts S1-1, S2-1, S3-1 and S4-1, to permit operation of the crane motor at only its lowest speed.

The control circuit of FIG. 3C has an alarm device 150, which may be a light, horn or the like, which has one of its terminals connected to the power line P1 and its other terminal connected through a set of normally-closed contacts R4-1 to the other power line P2. Another alarm device 150 is provided having one terminal connected to the power line P1 and its other terminal connected through a set of normally-closed contacts R1-1 to line P2. Contacts R4-1 are controlled by the relay R4 in the pilot sensing circuit 104 of the associated receiver and are closed by this relay when the amplitude of the pilot signal at the receiver output point 88 drops below a given selected value. The alarm 150' is energized when the relay R1 of the far range sensing circuit 90 of the associated receiver is operated to indicate that the associated crane has reached a maximum monitoring distance of 100 feet in the exemplary embodiment of the invention being described. Of course, the alarm device 150' could be arranged to be operated by contacts of relay R2 rather than by contacts of relay R1 if it so desired to initiate an alarm only when the crane reaches 50 feet of a collision point.

Figure 4:
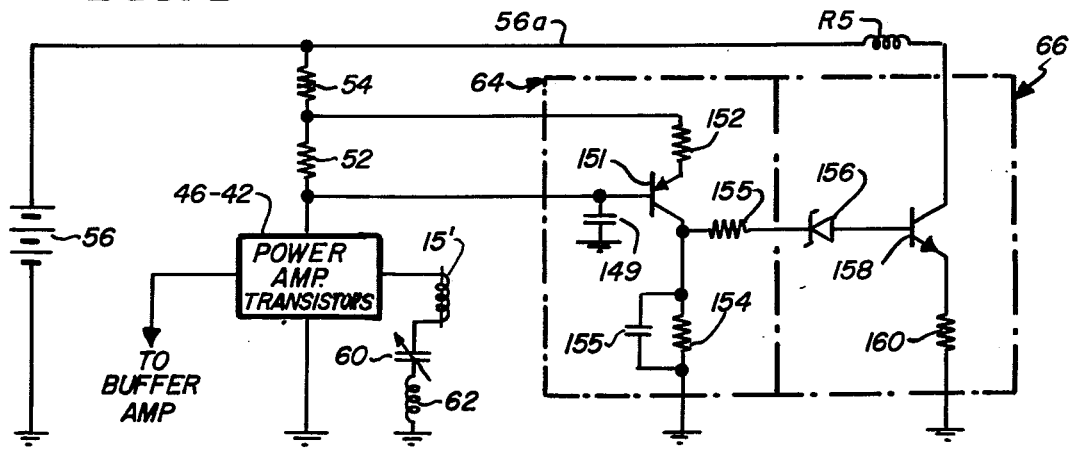
FIG. 4 is a circuit diagram which illustrates the portions of the circuit shown in block form in the transmitter circuit of FIG. 3A.

Reference should now be made to FIG. 4 which illustrates exemplary circuitry for the signal detector 64 and D.C. level detector 66 associated with the transmitter 15 and shown in block form in FIG. 3A. As there shown, the signal detector 64 comprises a PNP transistor 151 whose emitter is connected through a resistor 152 through the upper terminal of the resistor 52 which carries collector current of the power amplifier transistor 46. The base of the transistor 151 is connected to the bottom terminal of the resistor 52. A filter capacitor 149 is connected between the base of transistor 151 and ground. The collector of transistor 151 is connected through a resistor 154 to ground, and the resistor 154 is shunted by a filter capacitor 155. It is apparent that the voltage coupled between the emitter and base of the transistor 151 is a function of the amplitude of the current flow through the resistor 52 of the power amplifier circuit. The polarity of this voltage is such that, as the voltage increases, the voltage applied to the base of the transistor 151 becomes more negative which, for a PNP transistor, means that conduction thereof will be increased accordingly. As conduction of the transistor 151 increases, the voltage drop across resistor 154 relative to ground will proportionately increase.

The collector of the transistor 151 is coupled through a resistor 155 and a Zener diode 156 forming part of the D.C. level detector circuit to the base of a NPN transitor 158 whose collector is connected to the positive D.C. voltage bus 56a through the relay R5. The emitter of the transistor 158 is connected through a resistor 160 to ground.

It is noted that the cathode of the Zener diode 156 is connected through the resistor 155 to the collector of the transistor 151 where the voltage relative to ground is positive. The Zener diode conducts current only when the positive voltage applied to the cathode will exceed a given threshold level which, for example, can be considered for purposes of explanation to be plus 12 volts. When the power amplifier 45 is operating properly with adequate driving voltage on the bases of the transistors 46 and 47, and an antenna circuit which is properly tuned, current flowing through the resistor 52 will be above a minimum desired level, and the voltage applied to the emitter to base circuit of the transistor 151 will be adequately high to insure a voltage at the collector of the transistor 151 which exceeds the threshold voltage of the Zener diode 156. Accordingly, with the conduction of the Zener diode 156, the transistor 158 will be conducting adequately to energize the relay R5. However, if the antenna circuit should be substantially de-tuned or the power amplifier receive inadequate drive, the resultant lowering of the voltage across the resistor 52 will reduce the magnitude of the positive voltage on the collector of the transistor 151 to a point below 12 volts, and the Zener diode 156 will cease conducting. The transistor 158 will accordingly be rendered non-conductive along with the associated relay R5, which will energize the associated alarm devices 68 and 70 previously described.

The circuit of FIG. 4 is highly advantageous in that with a minimum number of circuit components it monitors both inadequate output and short circuit conditions across the terminals of the antenna 15' or across the entire antenna circuit. When this occurs, because of the relative values of resistors 52 and 54, the division of the voltage output of the D.C. voltage source 56 will be such that the voltage with respect to ground at the juncture between resistors 52 and 54 will sharply decrease to a value below the threshold voltage value of the Zener diode 156. For example, assuming that the output of the D.C. voltage source 56 is 18 volts, and the threshold voltage of the Zener diode 156 is 12 volts, when the antenna is short circuited this will materially reduce the impedance with respect to ground at the juncture between resistors 52 and 54, which will drop the voltage at this point below 12 volts. If this point is below 12 volts, manifestly the emitter of transistor 151 must be below 12 volts with respect to ground, and since the collector is even at a lower voltage than the emitter thereof, it is apparent that the Zener diode 156 will not conduct under antenna short circuit conditions.

Both the broad and specific aspects of the present invention have thus provided an exceedingly inexpensive and reliable vehicle proximity sensing and control system which has particular utility as an anti-collision system for cranes and the like, although many aspects in the invention have a much broader application.

It should be understood that numerous modifications may be made on the most preferred forms of the invention described without deviating from the broader aspects of the present invention.

I claim:

1. A proximity sensing and control system for a vehicle having powered drive means, the system comprising, in combination: a radio transmitter and associated transmitting antenna associated with the system for radiating an alternating electromagnetic field at a low enough frequency such that signal reinforcement or attenuation at a receiving location due to signal reflections from nearby objects does not generally occur, and the induction field component predominates in strength over the electric field within the desired operating range of the system; a radio receiver and associated receiving antenna for sensing the level of the electromagnetic field thereat, one of said antennas being mounted on said vehicle and the other antenna being mounted remote therefrom, so the spacing therebetween varies as the vehicle is moved; first control means for carrying out a first control operation when the transmitting and receiving antennas are relatively widely spaced apart; second control means for carrying out a second control operation when the transmitters and receiving antennas are relatively closely spaced apart, the relative signal strengths at the receiving antenna being vastly different for these two relative spacings; said radio receiver including a given received signal output point; first and second range sensing circuits connected in parallel to said received signal output point and respectively including first and second signal level detecting means responsive to given signal levels indicative respectively of said relatively wide and close spacings of said transmitting and receiving antennas by initiation of operation respectively of said first and second control means, and first and second adjusting means associated with said first and second range sensing circuits for adjusting the level of the received signal at said received signal output point which effects operation of the associated control means.

2. The proximity sensing and control system of claim 1 wherein said adjusting means in said first and second range sensing circuits are first and second signal level adjusting means which respectively adjust the amplitude of the signals fed to the associated signal level detecting means for a given amplitude signal at said received signal output point, the first and second signal level detecting means being operable at similar signal input levels for amplitudes of the received signal at said received signal output point having widely different values.

3. The proximity sensing and control system of claim 2 wherein the received signal at said received signal output point is a continuous sinusoidal-like signal varying widely in amplitude as said vehicle moves into positions where the spacings between said transmitting and receiving antennas have said relatively wide and close spacings, and first and second clipper means respectively associated with said first and second range sensing circuits coupled respectively between the outputs of said signal level adjusting means and the input of said first and second signal level detecting means which clipper means respectively clip the waveform of a signal fed thereto at a level above that which the received signals thereat would attain when said transmitting and receiving antennas have respectively said relatively wide and close spacing.

4. The proximity sensing and control system of claim 3 wherein the level at which said first and second clipper means clip the signal fed thereto is at most not much greater than about 3 times the amplitude of the received signal respectively fed to the input of the first and second clipper means when the transmitting and receiving antennas have said relatively wide and close spacings.

5. The proximity sensing and control system of claim 3 wherein there is coupled to the outputs of said first and second clipper means respective narrow bandpass filters which pass only signals of a desired narrow range of frequencies compatible with the stability of the transmitter; and said receiver including at a point in advance of said received signal output point a relatively wide bandpass filter which is at least about 10 times wider than the bandpass of said narrow bandpass filter.

6. The proximity sensing and control system of claim 1 combined with said powered drive means of said vehicle, manually operable control means for controlling the energization and speed of said powered drive means, and operation of said first control means automatically reducing and limiting the speed of said powered drive means and operation of said second control means stopping said vehicle independently of said manually operable control means.

7. The proximity sensing and control system of claim 1 wherein the transmitter antenna radiates a signal in the range of about 200–400 kHz.

8. The proximity sensing and control system of claim 6 wherein there is a third control means for the carrying out of a third control operation when the transmitting and receiving antennas have a given spacing much greater than said relatively close and wide spacings, the third control operation being the signaling of an operator; there being provided a third range sensing circuit connected in parallel with said first and second range sensing circuits and including signal level detecting means responsive to a given signal level by initiating operation of said third control means, said third range sensing circuit having adjusting means associated therewith for adjusting the level of the received signal at said received signal output point of the receiver which effects operation of said third control means.

9. The proximity sensing and control system of claim 8 wherein said vehicle is a crane and said third adjusting means of said third range sensing circuit is adjusted to operate said third control means to operate when said transmitting and receiving antennas are spaced somewhere in the range of about 50 to 100 feet.

10. The proximity sensing and control system of claim 6 wherein said vehicle is a crane and said adjusting means of said first range sensing circuit is adjusted to effect said speed reduction operation when the transmitting and receiving antennas are spaced apart somewhere within the range of about 25 to 50 feet.

11. The proximity sensing and control system of claim 3 wherein there is coupled to the outputs of said first and second clipper means respective narrow bandpass filters which pass only signals of a desired narrow range of frequencies compatible with the stability of the transmitter; and said receiver including at a point in advance of said received signal output point a relatively wide bandpass filter which is at least several times wider than the bandpass of said narrow bandpass filter.

12. The proximity sensing and control system of claim 6 wherein there are two vehicles, said radio transmitter and associated transmitting antenna is mounted on one of the vehicles and said radio receiver and associated receiving antenna is mounted on the other vehicle, and said associated first and second control means and range sensing circuits being respectively operable to reduce the speed and stop said other vehicle; and there being a second radio transmitter and associated transmitting antenna mounted on said other vehicle and a second radio receiver and associated receiving antenna mounted on said one vehicle with said second radio transmitter and radio receiver operating within a different frequency range than the first mentioned radio transmitter and radio receiver, and there being associated with said second radio receiver third and fourth control means and range sensing means similar to said first and second control means and said first and second range sensing circuits so that said one vehicle can be reduced in speed or stopped when it approaches said other vehicle at given distances.

13. The proximity sensing and control system of claim 1 wherein the spacings between said transmitting and receiving antennas when they are relatively closely and relatively widely spaced apart produce signals in said receiving antenna having a relative amplitude of the order of magnitude of at least about 60db.

14. The proximity sensing and control system of claim 1 wherein said transmitter includes an output power amplifier stage to which said transmitting antenna is coupled, antenna circuit tuning means connected to said transmitting antenna for establishing a tuned circuit at the desired transmitting frequency of the transmitter, said power amplifier stage being arranged so that current flow through a given portion thereof decreases to a given undesired low level when the power amplifier stage is not driven to a sufficient degree or the antenna circuit is de-tuned to an undesirable degree, and the current in said given portion of said power amplifier circuit rises to an undesiredly high level if the antenna circuit is short circuited; and further including a monitoring system for detecting the proper operation of said transmitter, said monitoring system including signal detector means responsive to the reduction of current in said power amplifier to said low level and also responsive to the raising of said power amplifier current to said undesirably high level for alerting an operator as to a fault in the transmitter.

15. A proximity sensing and control system for a vehicle having powered drive means, the sytem comprising, in combination: a radio transmitter and associated transmitting antenna associated with the system to radiate an alternating electromagnetic field at a low enough frequency such that signal reinforcement or attenuation at a receiving location due to signal reflections from nearby objects does not generally occur, and the induction field component predominates in strength over the electric field in the desired operating range of the system; a radio receiver and associated receiving antenna for sensing the level of the electromagnetic field thereat, one of said antennas being mounted on said vehicle and the other antenna being mounted remote therefrom, so the spacing therebetween varies as the vehicle is moved; the receiver including an amplifier capable of amplifying signals over at least about the order of magnitude of 60db input voltage range, such range corresponding to the electromagnetic field strength at the extremeties of the desired operating distances; A plurality of range sensing circuits including respective signal attenuators coupled to the output of said amplifier and capable of attenuating the wide input signal levels to similar levels from signals corresponding to those received at the associated monitoring distances to be detected; and a signal processing circuit following each of said attenuators, each of said processing circuits including, in the order named, a clipper, narrow band filter, signal level detector and control device coupled in tandem, said filter having a bandwidth which is a small fraction of the bandwidth of said receiver amplifier and at least as wide as required to accommodate the expected frequency variations of the desired signal, said clipper clipping the voltage at a level which is greater than the level which the desired signal is required to operate the signal level detector, the control means being operated by the associated signal level detector when the signal level is reached corresponding to the transmitting to receiving antenna spacing to be monitored there by.

16. A proximity sesing and control system for a vehicle having powered drive means, the system comprising, in combination: a radio transmitter and associated transmitting antenna associated with the system for radiating an alternating electromagnetic field at a low enough frequency such that reinforcement or attenuation at a receiving location due to signal reflections from nearby objects does not generally ocur, and the induction field component predominates in strength over the electric field within the desired operating range of the system; a radio receiver and associated receiving antenna for sensing the level of the electromagnetic field thereat, and providing at a received amplified signal output point an amplifier proportional to the signal sensed by the receiving antenna, one of said antennas being mounted on said vehicle and the other antenna being mounted remote therefrom, so the spacing therebetween varies as the vehicle is moved; control means for carrying out one or more control operations in response to the amplitude of the signal received by said receiving antennas indicating one or more spacings between said transmitting and receiving antennas; range sensing circuit means including signal level detecting means responsive to a given signal level by operating said control means means adjusting the level of the received signal at said received signal output point which effects operation of the associated control means, clipper means associated with said range sensing circuit means coupled between said received amplifier signal output point and the input of said signal level detecting means, which clipper means clips the waveform of a signal fed thereto at a level above that which the receive signals thereat would attain when said transmitting and receiving antennas are at one or more given spacings to be monitored and narrow bandpass filter means coupled to the output of said clipper means which filter means passes only signals of at least or not much more than a range of frequencies compatible with the frequency stability of said transmitter.

17. A proximity sensing and control system for a vehicle having powered drive means, the system comprising, in combination: a radio transmitter and associated transmitting antenna associated with the system for radiating an alternating electromagnetic field at a low enough frequency such that signal reinforcement or attenuation at a receiving location due to signal reflections from nearby objects does not generally occur, and the induction field component predominates in strength over the electric field within the desired operating range of the system, said transmitter including an output power amplifier stage to which said transmitting antenna is coupled, antenna circuit tuning means connected to said transmitting antenna for establishing a tuned circuit at at the desired transmitting frequency of the transmitter, said power amplifier stage being such that current flow through a given portion thereof decreases to a given desired low level when the power amplifier stage is not driven to a sufficient degree or the antenna circuit is de-tuned to an undesirable degree, and the current in said given portion of said power amplifier circuit rises to an undesiredly high level if the antenna circuit is short circuited; a receiver and associated receiving antenna for sensing the level of the electromagnetic field thereat as a result of the signal generated by said transmitting antenna; signal level detecting means associated with said receiver for effecting a given control operation when a signal in said receiver reaches a given level; and a monitoring system for detecting the proper operation of said transmitter, said monitoring system including signal detector and level responsive means responsive to the reduction of current in said given portion of said power amplifier to said low level and also responsive to the raising of said power amplifier current to said undesirably high level for alerting in either case an operator as to a fault in the transmitter.

18. The proximity sensing and control system of claim 17 wherein said power amplifier stage includes a series circuit of elements coupled across the terminals of a source of energizing voltage, said series circuit of elements includes in the order named, first and second impedance means, the load terminals of an amplifier device having a control terminal which is driven by the signal to be transmitted, and the antenna circuit, said signal detector means including a detector stage including a current control device with load terminals wherein said load terminals and a third impedance are coupled in the order named between the juncture of said first and second impedance means and the terminal of said source of energizing voltage most remote from said first impedance means, said current control device having a control terminal coupled to the terminal of said second impedance means remote from said first impedance means to effect the variation in current flow in the load terminals of said current device in proportion to voltage drop across said second impedance means, the voltage across said third impedance means dropping below a given threshold level when current flow through said second impedance means drops below a given value and when the antenna circuit is short circuited due to voltage division action, and voltage level responsive means responsive to the drop of the voltage across said third impedance means below said threshold level to alert an operator as to a defectively operating transmitter.

19. A proximity sensing and control system for a vehicle having powered drive means, the system comprising, in combination: a radio transmitter and associated transmitting antenna associated with the system for radiating an alternating electromagnetic field at a low enough frequency such that signal reinforcement or attenuation at a receiving location due to signal reflections from nearby objects does not generally occur, and the induction field component predominates in strength over the electric field within the desired operating range of the system; a radio receiver and associated receiving antenna for sensing the level of the electromagnetic field thereat, one of said antennas being mounted on said vehicle and the other antenna being mounted remote therefrom, so the spacing therebetween varies as the vehicle is moved; first control means for carrying out a first control operation when the transmitting and receiving antennas are relatively widely spaced apart; second control means for carrying out a second control operation when the transmittersand receiving antennas are relatively closely spaced apart, the relative signal strengths at the receiving antenna being vastly different for these two relative spacings; said radio receiver including a given received amplified signal output point; first and second range sensing circuits respectively including first and second signal level detecting means responsive to given signal levels indicative respectively of said relatively wide and close spacings of said transmitting and receiving antennas by initiation of operation respectively of said first and second control means, and operation of said first control means automatically reducing and limiting the speed of said powered drive means and operation of said second control means stopping said vehicle independently of said manually operable control means.

20. The proximity sensing and control system of claim 19 wherein the transmitter antenna radiates a signal in the range of about 200 to 400 kHz.

21. In a control system comprising, a superheterodyne receiver and associated receiving antenna for sensing the level of a transmitted electromagnetic field thereat; said receiver comprising a first local oscillator, a mixer coupled to said receiving antenna and local oscillator to provide a beat intermediate frequency signal from the received signal received by said receiver antenna and the output of said local oscillator, and an intermediate frequency amplifier coupled to output of said first mixer; and a signal level detecting means for effecting a control operation when the output signal of said amplifier reaches a given level; the improvement comprising a monitoring system for monitoring the operation of the receiver said monitoring system comprising a signal generating means including a source of a signal having a frequency which when added or subtracted from the signal of said local oscillator produces a pilot signal substantailly different from said intermediate frequency but which passes through said intermediate frequency amplifier at an amplitude which can be detected when the receiver is operating properly; a secon mixer for receiving the output of said local oscillator and said pilot signal generating means and producing said pilot signal at said second beat frequency; means for adjusting the amplitude of the pilot signal produced by said second mixer; a pilot signal detecting circuit coupled to the output of said intermediate frequency amplifier and including pilot signal level responsive means responsive to the dropping of the pilot signal fed thereto to a given monitoring level for indicating the presence of an inadequately operating receiver; and said pilot signal detecting circuit including means for filtering out said intermediate frequency signal resulting from the signal received by said receiving antenna wherein the pilot signal level responsive means responds only to the pilot signal.

* * * * *